US008249621B2

(12) United States Patent
Ghosh et al.

(10) Patent No.: US 8,249,621 B2
(45) Date of Patent: *Aug. 21, 2012

(54) FREQUENCY OF GEOGRAPHIC LOCATION UPDATES FOR AN ELECTRONIC DEVICE BASED ON USER COMMUNICATION

(75) Inventors: Debajit Ghosh, Menlo Park, CA (US); Charles Mendis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,304

(22) Filed: Oct. 21, 2010

(65) Prior Publication Data

US 2012/0101726 A1   Apr. 26, 2012

(51) Int. Cl.
*H04W 24/00* (2009.01)
(52) U.S. Cl. .................. 455/456.1; 455/456.3; 455/457; 455/404.2; 455/414.3; 455/466
(58) Field of Classification Search ....... 455/456.1–457, 455/404.1–404.2
See application file for complete search history.

(56) References Cited

U.S. PATENT DOCUMENTS

| | | | | |
|---|---|---|---|---|
| 6,804,524 B1 * | 10/2004 | Vandermeijden | ........... | 455/456.1 |
| 7,177,623 B2 * | 2/2007 | Baldwin | ..................... | 455/404.2 |
| 7,477,903 B2 * | 1/2009 | Wilcock et al. | ............. | 455/456.1 |
| 7,477,906 B2 * | 1/2009 | Radic et al. | ................. | 455/456.2 |
| 7,606,579 B2 * | 10/2009 | Thacher | ....................... | 455/456.1 |
| 2004/0198386 A1 * | 10/2004 | Dupray | ....................... | 455/456.1 |
| 2005/0075119 A1 | 4/2005 | Sheha et al. | | |
| 2009/0275348 A1 | 11/2009 | Weinreich et al. | | |
| 2010/0205242 A1 | 8/2010 | Marchioro et al. | | |
| 2010/0251340 A1 | 9/2010 | Martin et al. | | |
| 2010/0325194 A1 * | 12/2010 | Williamson et al. | ........... | 709/203 |

OTHER PUBLICATIONS

International Search Report and Written Opinion of International Application No. PCT/US2011/057369, Korean Intellectual Property Office, mailed on May 4, 2012, 10 pages.

* cited by examiner

*Primary Examiner* — Sharad Rampuria
(74) *Attorney, Agent, or Firm* — Sterne, Kessler, Goldstein and Fox P.L.L.C.

(57) ABSTRACT

A method, computer program product, and system are provided to update geographic location information for an electronic device. The method can include transmitting the geographic location information for the electronic device to a server device at a first time interval. A determination can be made regarding whether the electronic device is in communication with a third-party device. If the electronic device is in communication with the third-party device, then updated geographic location information for the electronic device is transmitted to the server device at a second time interval, where the second time interval is shorter than the first time interval.

27 Claims, 6 Drawing Sheets

FREQUENCY OF GEOGRAPHIC LOCATION UPDATES FOR AN ELECTRONIC DEVICE BASED ON USER COMMUNICATION

BACKGROUND

1. Field

Embodiments generally relate to updates in geographic location information for an electronic device.

2. Background

Many electronic devices include location-based service (LBS) applications, which allow a geographic location of the electronic device to be either displayed on the device or transmitted to a server device for access by another electronic device (e.g., third-party device). LBS applications can be used to identify and track the geographic location of electronic device users. For instance, LBS applications can enable the electronic device user to initiate a location request for the user's current geographic location, in which the electronic device serves as a Global Positioning System (GPS) terminal. The location of the electronic device user can also be determined based on, for example, Wi-Fi and Cell ID location methods. Also, LBS applications can transmit geographic location information for the electronic device to a server device, allowing a user of a third-party device to access and view the location of the electronic device user. The electronic device user can manually control the accuracy and details of the geographic location information viewed by third parties.

Various methods and techniques can be used to assess the geographic location of the electronic device user. For instance, a mobile phone with an embedded GPS can send position coordinates to a mobile network server such that other users of the mobile network server can view the geographic location of the mobile phone. In battery-operated electronic devices (e.g., mobile phones, personal digital assistants, and laptops), embedded hardware and software associated with LBS applications can consume a significant portion of the device's computing and battery resources. Moreover, as the frequency of location updates sent from the battery-operated electronic device to a centralized network server increases, the embedded hardware and software associated with LBS applications process the location updates more frequently, thus limiting computation and battery resources for other applications on the electronic device.

Methods and systems are needed to provide geographic location information for an electronic device, while conserving battery and computation resources of the electronic device.

SUMMARY

Embodiments include a method of providing geographic location information for an electronic device. The method includes transmitting the geographic location information for the electronic device to a server device at a first time interval. A determination is made regarding whether the electronic device is in communication with a third-party device. The communication link between the electronic device and the third-party can include, for example and without limitation, a voice communication, a text message, and an email communication between the electronic device and the third-party device. If the electronic device is in communication with the third-party device, then updated geographic location information for the electronic device is transmitted to the server device at a second time interval, where the second time interval is shorter than the first time interval. The second time interval can be based on a rate of change in GPS location of the electronic device over time.

Embodiments additionally include a computer program product that includes a computer-usable medium with computer program logic recorded thereon that, when executed by one or more processors, provides geographic location information for an electronic device. The computer program logic includes the following: first computer readable program code that enables a processor to transmit geographic location information for the electronic device to a server device at a first time interval; second computer readable program code that enables a processor to determine whether the electronic device is in communication with a third-party device; and, third computer readable program code that enables a processor to transmit updated geographic location information for the electronic device to the server device at a second time interval when the electronic device is in communication with the third-party device, where the second time interval is shorter than the first time interval.

Embodiments further include a system for providing geographic location information for an electronic device. The system includes a Global Positioning System (GPS), a transceiver device, and a computing device. The GPS is configured to calculate the geographic location information for the electronic device. The transceiver device is configured to transmit the geographic location information to a server device at a first time interval. The computing device is configured to perform the following functions: determine whether the electronic device is in communication with a third-party device; and, transmit, via the transceiver device, updated geographic location information for the electronic device to the server device at a second time interval when the electronic device is in communication with the third-party device, where the second time interval is shorter than the first time interval. The computing device can include one or more processors.

Further features and advantages described herein, as well as the structure and operation of various embodiments, are described in detail below with reference to the accompanying drawings. It is noted that the following description is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles herein and to enable a person skilled in the relevant art to make and use the embodiments described herein.

DETAILED DESCRIPTION

The following detailed description refers to the accompanying drawings that illustrate exemplary embodiments. Other embodiments are possible, and modifications can be made to the embodiments within the spirit and scope of the detailed description.

It would be apparent to a person skilled in the relevant art that the embodiments, as described below, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments described below are possible, given the level of detail presented herein.

Figure 1:
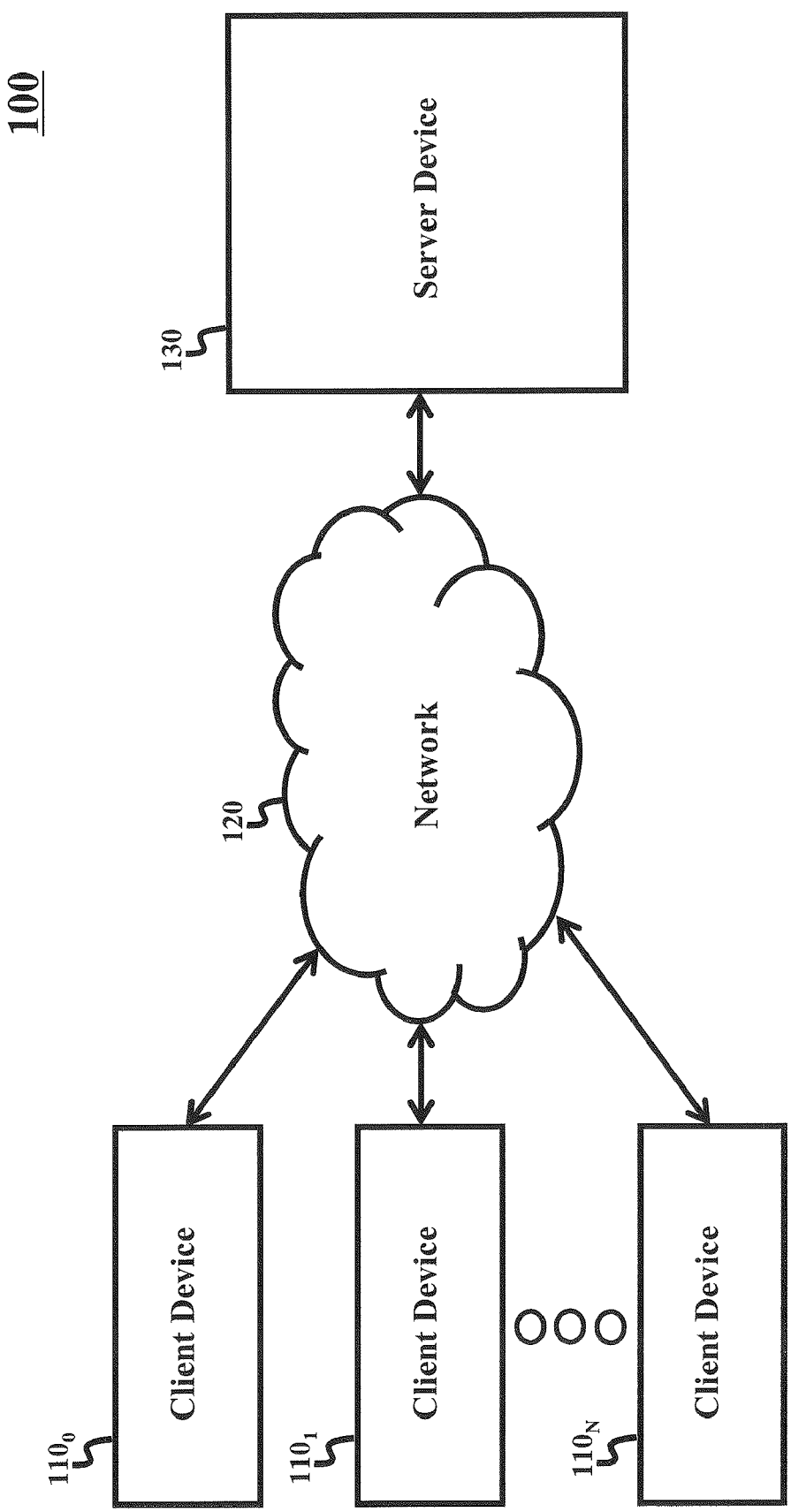
FIG. 1 is an illustration of an exemplary communication system in which embodiments can be implemented.

FIG. 1 is an illustration of an exemplary communication system 100 in which embodiments described herein can be implemented. Communication system 100 includes client devices $110_0$-$110_N$ that are communicatively coupled to a server device 130 via a network 120.

Client devices $110_0$-$110_N$ can be, for example and without limitation, mobile phones, personal digital assistants (PDAs), laptops, or other similar types of electronic devices, or a combination thereof.

Server device 130 can be, for example and without limitation, a telecommunication server, a web server, or other similar types of database servers. In an embodiment, server device 130 can have multiple processors and multiple shared or separate memory components such as, for example and without limitation, one or more computing devices incorporated in a clustered computing environment or server farm. The computing process performed by the clustered computing environment, or server farm, can be carried out across multiple processors located at the same or different locations. In an embodiment, server device 130 can be implemented on a single computing device. Examples of computing devices include, but are not limited to, a central processing unit, an application-specific integrated circuit, or other types of computing devices having at least one processor and memory.

Further, network 120 can be, for example and without limitation, a wired (e.g., ethernet) or a wireless (e.g., Wi-Fi and 3G) network that communicatively couples client devices $110_0$-$110_N$ to server device 130.

In an embodiment, communication system 100 can be a mobile telecommunication system (e.g., 3G and 4G mobile telecommunication systems), in which mobile devices (e.g., client devices $110_0$-$110_N$ of FIG. 1) can communicate with one another (e.g., via speech and data services) with the use of a mobile telecommunication network (e.g., network 120 of FIG. 1) and a mobile network server (e.g., server device 130 of FIG. 1).

Figure 2:
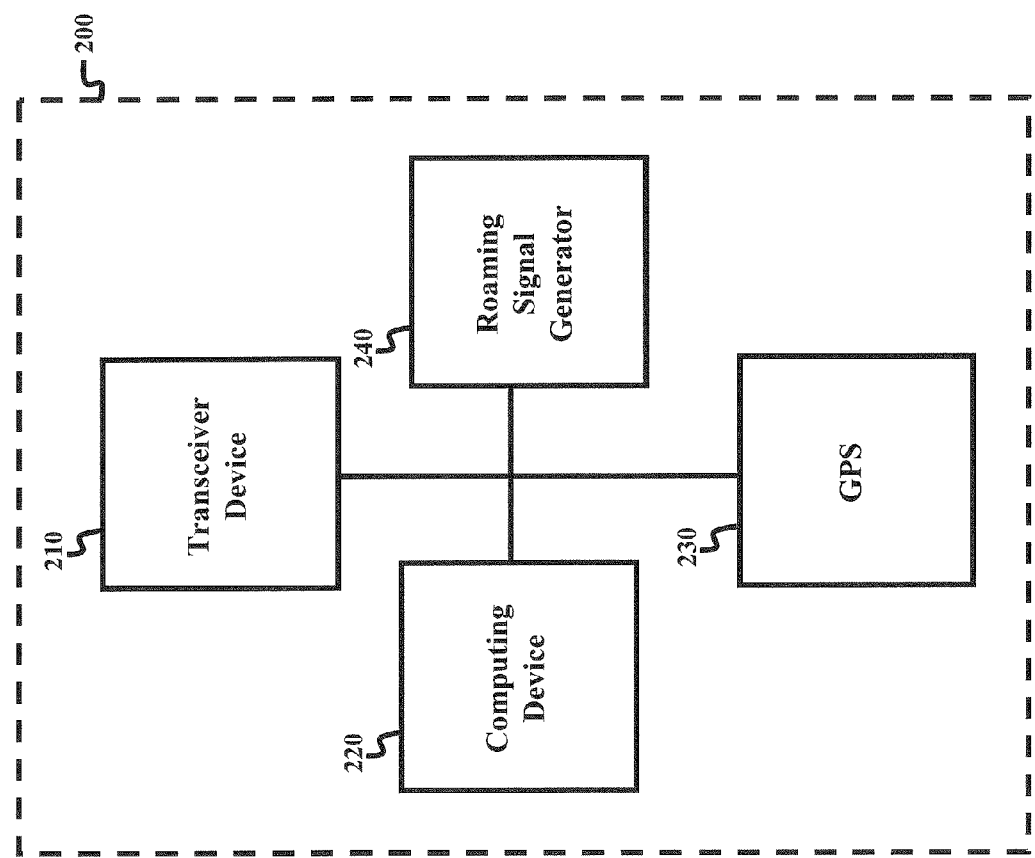
FIG. 2 is an illustration of an embodiment of a mobile device in which embodiments can be implemented.

FIG. 2 is an illustration of an embodiment of a mobile device 200 in which embodiments described herein can be implemented. Mobile device 200 includes a transceiver device 210, a computing device 220, a Global Positioning System (GPS) 230, and a roaming signal generator 240. In an embodiment, transceiver device 210 is configured to transmit and receive communication signals (e.g., voice and data signals) over a mobile telecommunication network (e.g., network 120 of FIG. 1), as would be understood by a person skilled in the relevant art. In an embodiment, roaming signal generator 240 is configured to emit a roaming signal to a nearby antenna (e.g., tower) in the mobile telecommunication network, in which the roaming signal can be used to track a geographic location of mobile device 200 (described further below). Computing device 240 is configured to control operations and functions of mobile device 200 such as, for example and without limitation, a transmission/reception of communication signals via transceiver device 210 and functions associated with LBS applications loaded on mobile device 200 via GPS 230 and roaming signal generator 240.

Mobile device 200 is also equipped with GPS 230, which can calculate a geographic location (e.g., latitude and longitude coordinates) of mobile device 200 and then send the geographic location information to the mobile network server (e.g., server device 130 of FIG. 1) for access by a third-party device, according to an embodiment. GPS technology and associated methods to calculate and transmit GPS-based geographic location information from mobile device 200 to the mobile network server are known to persons skilled in the relevant art.

As described herein, the term "third-party device" refers to an electronic device other than mobile device 200 of FIG. 2 or a software application (e.g., LBS application) loaded on an electronic device other than mobile device 200. For ease of explanation, the third-party device described in the embodiment herein refers to an electronic device other than mobile device 200. The third-party device can include, for example and without limitation, a laptop, a personal digital assistant, a desktop computer, and other similar types of electronic devices. However, based on the description herein, a person skilled in the relevant art will recognize that the embodiments described herein are equally applicable to a software application loaded on an electronic device other than mobile device 200 and equivalents thereof.

In another embodiment, the geographic location of the mobile device 200 can be calculated based on a signal strength of a roaming signal transmitted from roaming signal generator 240 to a nearby antenna (e.g., a mobile base station) in the mobile telecommunication system. A rough estimation of the mobile device's geographic location can be based on the location of the nearby antenna that receives the strongest signal from roaming signal generator 240 (e.g., cell identification or cell of origin), according to an embodiment. That is, the geographic location of mobile device 200 can be determined based on a predetermined radial distance from the nearby antenna. In an embodiment, an accurate estimation of the geographic location of mobile device 200 can be determined using a triangulation method based on the strength of the signal emitted from roaming signal generator 240 with respect to a plurality of surrounding antennas. Triangulation methods and techniques to determine a geographic location of mobile device 200 based on the signal strength of the mobile device's roaming signal are known to persons skilled in the relevant art. The rough estimation and/or the accurate estimation of the mobile device's geographic location can be stored on the mobile network server (e.g., server device 130 of FIG. 1) for access by a third-party device, according to an embodiment.

In yet another embodiment, the geographic location information for mobile device 200 can be calculated based on a combination of GPS information from mobile device 200 (e.g., via GPS 230) and location information determined from the mobile telecommunication system (e.g., location of nearby antenna towers and triangulation methods). For instance, an Assisted GPS (A-GPS) technique can be used to calculate the geographic location information for mobile device 200 based on location information from GPS 230 and location information based on the strength of a signal emitted from roaming signal generator 240. A-GPS techniques are known to persons skilled in the relevant art. In an embodiment, the geographic location information derived from the combination of GPS 230 and roaming signal generator 240 can be stored on the mobile network server (e.g., server device 130 of FIG. 1) for access by a third-party device.

In an embodiment, after the geographic location information for mobile device 200 is stored on the mobile network server, a third-party device (e.g., an electronic device other than mobile device 200) can access the geographic location information for mobile device 200 from the mobile network server. The third-party device can access the geographic location information for mobile device 200 by transmitting a location request to the mobile network server, according to an embodiment. For instance, mobile device 200 and the third-party device can both have a LBS application loaded thereon, in which the LBS application for each respective electronic device allows mobile device 200 and the third-party device to track the geographic location of one another. In particular, the third-party device can calculate its geographic location using, for example and without limitation, one of the geographic location methods described above with respect to the mobile device 200. The geographic location information for the third-party device can also be stored on the mobile network server for access by other electronic devices such as, for example and without limitation, mobile device 200.

With respect to FIG. 1, in another embodiment, communication system 100 can be an internet communication system, in which computing devices (e.g., client devices 110$_0$-110$_N$ of FIG. 1) can communicate with one another (e.g., via voice-over-internet protocol (VoIP) and data services) with the use of an internet network (e.g., network 120 of FIG. 1) and an internet network server (e.g., server device 130 of FIG. 1). The computing devices can include, for example and without limitation, mobile phones, personal digital assistants, laptops, and other similar types of computing devices. In an embodiment, the computing devices can each be equipped with a GPS, which can calculate a geographic location (e.g., latitude and longitude coordinates) of the computing device and then send the geographic location information to the internet network server for access by a third-party device, according to an embodiment.

When the computing device is unable calculate its geographic location via GPS, other geographic location indicators can be used to determine the geographic location of the computing device, according to an embodiment. For example, the computing device can be connected to the internet network and assigned an Internet Protocol (IP) address. As would be understood by persons skilled in the relevant art, the computing device's IP address can be used to calculate geographic location information for the computing device. In an embodiment, the geographic location information for the computing device can be stored on the internet network server for access by a third-party device.

In an embodiment, after the geographic location of the computing device is stored on the internet network server, the third-party device (e.g., an electronic device other than the computing device) can access the geographic location information for the computing device. The third-party device can access the geographic location information for the computing device by transmitting a location request to the internet network server, according to an embodiment. For instance, the computing device and the third-party device can both have a LBS application loaded thereon, in which the LBS application for each respective electronic device allows the computing device and the third-party device to track the geographic location of one another. In particular, the third-party device can calculate its geographic location using, for example and without limitation, its IP address. The geographic location information for the third-party device can also be stored on the internet network server for access by other electronic devices such as, for example and without limitation, the computing device.

Based on the description herein, a person skilled in the relevant art will recognize that other communication systems and associated electronic devices can be used with the embodiments described herein. These other communication systems and associated electronic devices are within the scope and spirit of the embodiments described herein.

Figure 3:
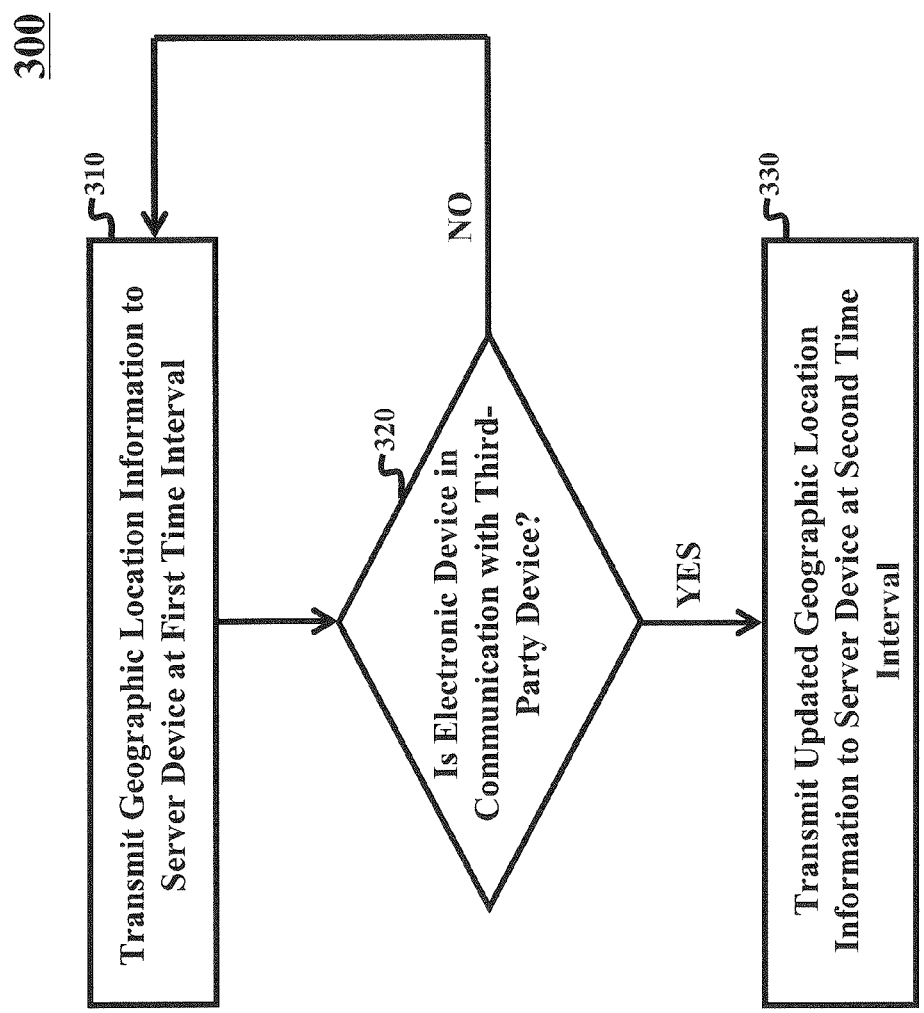
FIG. 3 is an illustration of an embodiment of a method of providing geographic location information for an electronic device.

FIG. 3 is an illustration of an embodiment of a method 300 of providing geographic location information for an electronic device. Method 300 can occur using, for example, computer system 100 of FIG. 1. For ease of explanation, computer system 100 will be used to facilitate in the description of method 300. Also, for ease of explanation, each of client devices 110$_0$-110$_N$ is a mobile phone with an embedded GPS and roaming signal generator (e.g., GPS 230 and roaming signal generator 240 of FIG. 2, respectively), network 120 is a mobile telecommunication network, and server device 130 is a mobile network server. Based on the description herein, a person skilled in the relevant art will recognize that method 300 can be executed on other types of computer systems with other types of associated client devices, networks, and servers. These other types of computer systems are within the scope and spirit of the embodiments described herein.

In an embodiment, method 300 can be performed in conjunction with an LBS application loaded on a mobile phone. For ease of explanation, it is assumed that the LBS application can allow other electronic devices (also referred to herein as "third-party devices") to access and view geographic location information for the mobile phone, as well as allow the mobile phone to access and view geographic location information for the third-party device.

For instance, the mobile phone can have an LBS application that controls the mobile phone to transmit geographic location information for the mobile phone to the mobile network server on a periodic basis in order provide up-to-date location information for access by third-party devices (e.g., other mobile phones). The third-party device can access and view geographic location information for the mobile phone by retrieving the geographic location information from the mobile network server via the mobile telecommunication network. Conversely, the mobile phone can also access and view geographic location information for the third-party device, where the third-party device transmits its geographic location information to the mobile network server in a similar manner as the mobile phone. In an embodiment, the LBS application on the mobile phone can allow the mobile phone to transmit its geographic location information to the mobile network server for access by the third-party device, but the LBS application on the third-party device can prevent the mobile phone from accessing geographic location information for the third-party device via the mobile network server. Based on the description herein, a person skilled in the relevant art will recognize that various permission controls can be set in the LBS applications on the mobile phone and the third-party device to allow or prevent access to geographic location information of each of the respective electronic devices.

A tradeoff, among others, exists between the frequency at which the mobile phone transmits its geographic location information to the mobile network server and a benefit that a user of the third-party device receives in accessing and viewing up-to-date location information. In particular, an increase in frequency of the mobile phone's transmission of geographic location information to the mobile network server can lead to an improved user experience for the third-party device user and/or the mobile phone user in the ability to receive and/or transmit up-to-date geographic location information. However, as the frequency in transmission of geographic location information increases, the mobile phone's battery resources decrease and the computing resources for other applications on the mobile phone decrease as well. Among other things, method 300 addresses this tradeoff between user experience and consumption of the mobile phone's battery and computation resources.

A benefit of method 300, among others, is that geographic location updates are provided by the mobile phone to the mobile network server during a time period that is beneficial to both the mobile phone and third-party device users. In particular, while the mobile phone is in communication with the third-party device (e.g., via voice, email, and text messaging communication), the mobile phone and/or the third-party device can transmit their respective geographic location information to the mobile network server. In turn, the mobile phone and/or the third-party device can retrieve up-to-date geographic location information for the other electronic device. This up-to-date location information for the mobile phone and/or the third-party device leads to an improved user experience in LBS applications, as well as conserves battery and computation resources of the electronic devices. In essence, method 300 provides up-to-date geographic location information to the mobile network server when the mobile phone is in communication with the third-party device.

As referred to herein, the term "communication" refers to a transfer of information from one entity (e.g., the mobile phone) to another entity (e.g., the third-party device). For exemplary purposes, the communication between the mobile phone and the third-party device of method 300 will be described in the context of electronic data transfer between the mobile phone and the third-party device. The communication includes, for example and without limitation, voice, email, and text messaging communication. Based on the description herein, a person skilled in the relevant art will recognize that other forms of communication are equally applicable to the embodiments described herein.

In reference to step 310 of FIG. 3, the mobile phone transmits its geographic location information to the mobile network server at a first time interval. In addition, the mobile phone can access the mobile network server during the first time interval in order to receive geographic location information for the third-party device, according to an embodiment.

In an embodiment, the time period associated with first time interval in step 310 is specific to the implementation of the mobile phone and the LBS application loaded thereon. For example, the LBS application may refresh the geographic location of the mobile phone (e.g., transmission of geographic location information for the mobile phone to the mobile network server) more frequently when the mobile phone is plugged into an external energy source (e.g., wall outlet) than when the mobile phone operates on its own battery resources. In another example, the LBS application may refresh the geographic location information for the mobile phone when the phone is inactive (e.g., no applications or programs being executed on the mobile phone) for a predetermined period of time. In yet another example, the LBS application may refresh the geographic location information for the mobile phone based on a user preference setting (e.g., every 2, 5, or 10 minutes). Based on the description herein, a person skilled in the relevant art will recognize that the refresh policy for the mobile phone and the LBS application loaded thereon can be based on additional factors.

In an embodiment, the LBS application may refresh the geographic location information for the mobile phone based on a dynamic time interval. The dynamic time interval can be based on an algorithm that accounts for various factors such as, for example and without limitation, travel behavior data of the mobile phone and energy consumption of the mobile phone's battery resources.

In an embodiment, the mobile phone can transmit GPS location information to the mobile network server (e.g., as described above with respect to mobile device 200 of FIG. 2). The geographic location of the mobile phone can also be estimated based on a signal strength of a roaming signal transmitted from the roaming signal generator of the mobile phone to a nearby antenna, according to an embodiment. In yet another embodiment, A-GPS techniques can be used to calculate the geographic location information for the mobile phone (e.g., as described above with respect to mobile device 200 of FIG. 2).

The geographic location information for the mobile phone can include information relating to latitude-longitude coordinates, a street location, a city location, a state location, and a country location for the mobile phone, according to an embodiment. In an embodiment, the mobile phone can transmit both rough geographic location information (e.g., city location, state location, and country location of the mobile phone) and accurate geographic location information to the mobile network server (e.g., latitude-longitude coordinates of the mobile phone).

In another embodiment, the mobile phone can transmit either accurate or rough geographic location information to the mobile network server. In an embodiment, if the mobile phone and the third-party device are located more than a predetermined distance from one another, then the mobile phone transmits rough geographic location information to the mobile network server. For instance, if the mobile device and the third-party device are located in different cities, states, or countries, then the mobile phone user may not prefer to transmit accurate geographic location information (e.g., latitude-longitude coordinates and/or a street location of the mobile phone) to the mobile network server because costs associated with battery and computation resources to transmit the accurate geographic location information to the mobile network server may outweigh the usefulness of the information to the user of the third-party device. Rather, the mobile phone can transmit a roaming signal via its roaming signal generator and allow the mobile telecommunication network to identify a location of the mobile phone based on a reception of the roaming signal by nearby antennas (see, e.g., description of roaming signal generator 240 of FIG. 2). In turn, the battery and computing resources of the mobile phone can be conserved.

In reference to step 320 of FIG. 3, a determination is made regarding whether the mobile phone is in communication with a third-party device. A communication link can be formed between the mobile phone and the third-party device in a variety of ways such as, for example and without limitation, voice communication, text messaging, and email communication. In an embodiment, the communication link can be formed via one mode of communication or a plurality of modes of communication. For instance, the communication link can be formed between the mobile phone and the third-party device via voice communication, text messaging, or email communication. Alternatively, the communication link can be formed via voice communication and text communication, in which the use of both modes of communication by the mobile phone and/or the third-party device overlaps one another. Based on the description herein, a person skilled in the relevant art will recognize that communication links based on other combinations of modes of communication can be established between the mobile phone and the third-party device.

In an embodiment, the mobile phone and the third-party device each have a LBS application loaded thereon, in which the LBS application includes an application programming interface (API) to allow the mobile phone and the third-party device to interact with communication applications loaded thereon. These communication applications include applications associated with, for example and without limitation, voice communication, text messaging, and email. Based on the LBS API's interaction with the communication applications, the determination can be made in step 320 regarding whether the mobile phone is in communication with the third-party device, as would be understood by a person skilled in the relevant art.

Based on the description herein, a person skilled in the relevant art will recognize that other methods and techniques can be used to determine whether the mobile phone is in communication with the third-party device. For instance, a mobile network server (e.g., server device 130 of FIG. 1) can monitor whether a communication link is established between the mobile phone and the third-party device. These other methods and techniques are within the scope and spirit of the embodiments described herein.

In step 330, if the mobile phone is in communication with the third-party device, then updated geographic location information for the mobile phone is transmitted to the mobile network server at a second time interval. In an embodiment, the communication link between the mobile phone and third-party device is an indication to the LBS application (loaded on the mobile phone) that the third-party device may seek up-to-date geographic location information for the mobile phone. In turn, during the communication between the mobile phone and the third-party device, the mobile phone transmits its geographic location information (e.g., GPS latitude and longitude coordinates) to the mobile network server such that a user of the third-party device can access and view up-to-date information for the mobile phone.

In an embodiment, the second time interval associated with step 330 is shorter than the first time interval associated with step 310. This is because, since the mobile phone is in communication with the third-party device, the third-party device may seek more frequent updates on the geographic location of the mobile phone than when the mobile phone and third-party device are not in communication with one another. In an embodiment, the second time interval can be based on a user preference setting (e.g., 0.5, 1.0, and 1.5 minutes).

In another embodiment, the second time interval can adaptively change based on a geographic location of the mobile phone over time. In particular, the time period associated with the second time interval can decrease or increase depending on whether the geographic location of the mobile phone changes over a predetermined number of time intervals. For instance, the second time interval can be set to 30 seconds, where the mobile phone transmits its geographic location information to the mobile network server every 30 seconds while the mobile phone is in communication with the third-party device. If the geographic location of the mobile phone changes over a time period of two minutes (e.g., over four time intervals), then the time period associated with the second time interval can decrease to, for example, 20 seconds. On the other hand, if the geographic location of the mobile phone does not change over a time period of two minutes, then the time period associated with the second time interval can increase to, for example, 40 seconds. A goal of adaptively changing the second time interval, among others, is to provide the third-party access to up-to-date geographic location information for the mobile phone while reducing battery and computing resources of the mobile phone when the geographic location of the mobile phone does not change over a predetermined amount of time.

An advantage, among others, of transmission of the geographic location information for the mobile phone to the mobile network server during an established communication link between the mobile phone and the third-party device is that the geographic location transmission can leverage resources of the mobile phone used for the communication between the two electronic devices. In an embodiment, a transceiver device (e.g., transceiver device 210 of FIG. 2) and a computing device (e.g., computing device 220 of FIG. 2) of the mobile phone may be used when the mobile phone is in communication with the third-party device. For example and without limitation, the transceiver device can be used to receive voice data from the mobile network server when the mobile phone is in communication with the third-party device. The computing device can be used to control the transmission and reception of the voice data via the transceiver device.

In an embodiment, the GPS of the mobile phone (e.g., GPS 230 of FIG. 2) can calculate a geographic location of the mobile phone and, in turn, the computing device can transmit the geographic location information, via the transceiver device, to the mobile network server while the mobile phone is in communication with the third-party device. As a result, up-to-date geographic location information for the mobile phone is available on the mobile network server for access by the third-party device. The transmission of the geographic location information from the mobile phone to the mobile network server leverages resources of the mobile phone already in use for communication—for example, the computing device and the transceiver device of the mobile phone. In turn, the battery resources of the mobile phone are not depleted at the same rate as compared to the battery resources expended if the voice communication and the geographic location update to the mobile network server are two separate and independent communications. Thus, a benefit of method 300, among others, is the transmission of geographic location information to the mobile network server during a communication link between the mobile phone and third-party device, thus reducing battery consumption due to the execution of the LBS application on the mobile phone.

Another benefit of method 300, among others, is that the communication between the mobile phone and the third-party device not only forms a communication link between the users of the mobile phone and third-party device (e.g., via voice communication, text messaging, and email communication), but also provides the third-party device up-to-date geographic location information for the mobile phone. In turn, the up-to-date geographic location information can lead to an improved user experience for the user of the third-party device for a variety of reasons such as, for example and without limitation, the user of the third-party device can assess the proximity of the mobile phone user and adjust his/her geographic location accordingly in order to be closer to (or farther away from) the mobile phone user. Based on the description herein, a person skilled in the relevant art will recognize other benefits in the access and review of up-to-date geographic location information.

In another embodiment of method 300, method 300 can include only steps 320 and 330 (i.e., step 310 is not performed). In effect, the mobile phone transmits its geographic location information to the mobile network server only when the mobile phone is in communication with the third-party device (see steps 320 and 330), according to an embodiment. In limiting the transmission of the mobile phone's geographic location information to time periods when the mobile phone is in communication with the third-party device, battery and computation resources of the mobile phone can be conserved.

Figure 4:
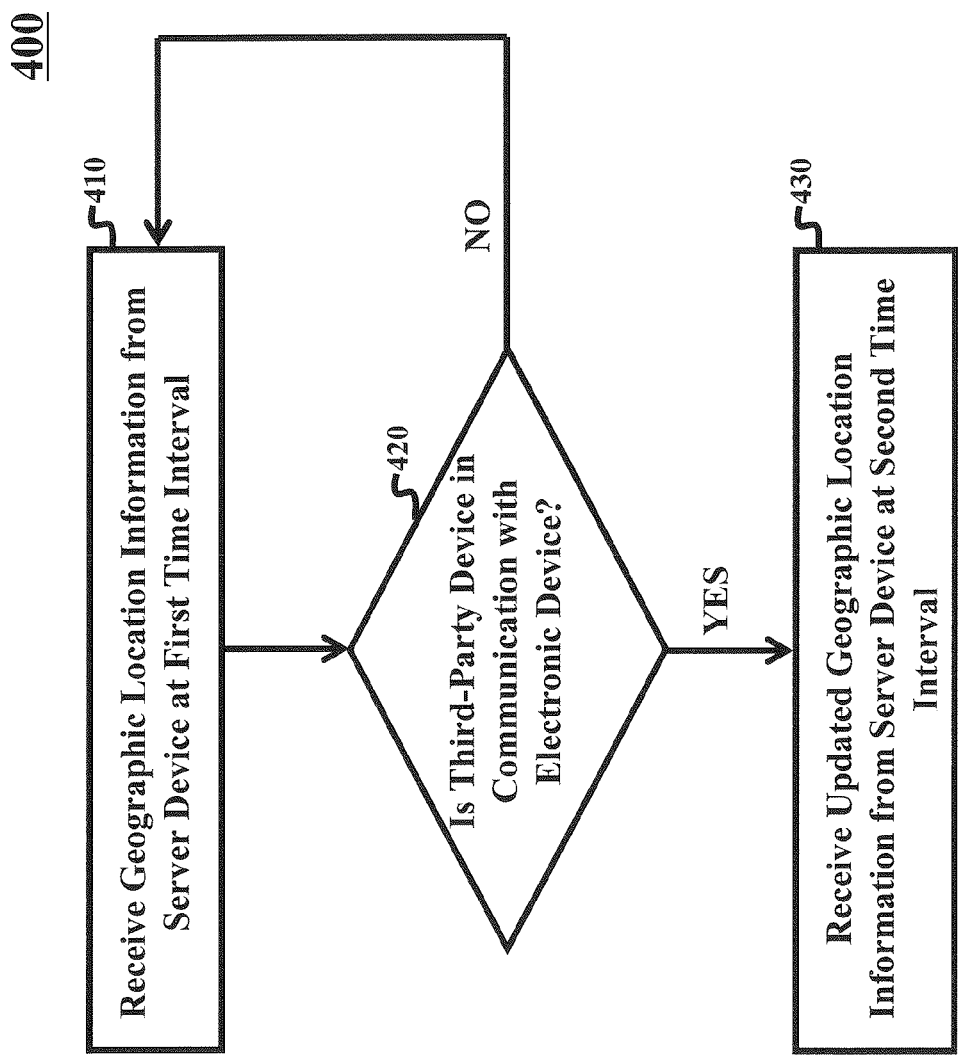
FIG. 4 is an illustration of an embodiment of a method of receiving geographic location information for an electronic device.

FIG. 4 is an illustration of an embodiment of a method 400 of receiving geographic location information for an electronic device. Method 400 can occur using, for example, computer system 100 of FIG. 1. For ease of explanation, computer system 100 will be used to facilitate in the description of method 400. Also, for ease of explanation, each of client devices $110_0$-$110_N$ is a mobile phone with an embedded GPS and roaming signal generator (e.g., GPS 230 and roaming signal generator 240 of FIG. 2, respectively), network 120 is a mobile telecommunication network, and server device 130 is a mobile network server. Based on the description herein, a person skilled in the relevant art will recognize that method 400 can be executed on other types of computer systems with other types of associated client devices, networks, and servers. These other types of computer systems are within the scope and spirit of the embodiments described herein.

The description of method 400 is similar to that of method 300 of FIG. 3. In particular, method 400 is described from the perspective of the third-party device, in which the third-party device accesses geographic location information that has been transmitted from the mobile phone to the mobile network server.

In reference to step 410 of FIG. 4, the third-party device receives, from the mobile network server, geographic location information for the mobile phone at a first time interval. The first time interval associated with step 410 can be determined in a similar manner as the first time interval associated with step 310 of FIG. 3 (described above).

In step 420, a determination is made regarding whether the third-party device is in communication with the mobile phone. A communication link can be formed between the third-party device and the mobile phone in a variety of ways such as, for example and without limitation, voice communication, text messaging, and email communication.

In step 430, if the third-party device is in communication with the mobile phone, then the third-party device receives, from the mobile network server, updated geographic location information for the mobile phone at a second time interval. In an embodiment, the second time interval is shorter than the first time interval. The second time interval associated with step 430 can be determined in a similar manner as the second time interval associated with step 330 of FIG. 3 (described above).

Figure 5:
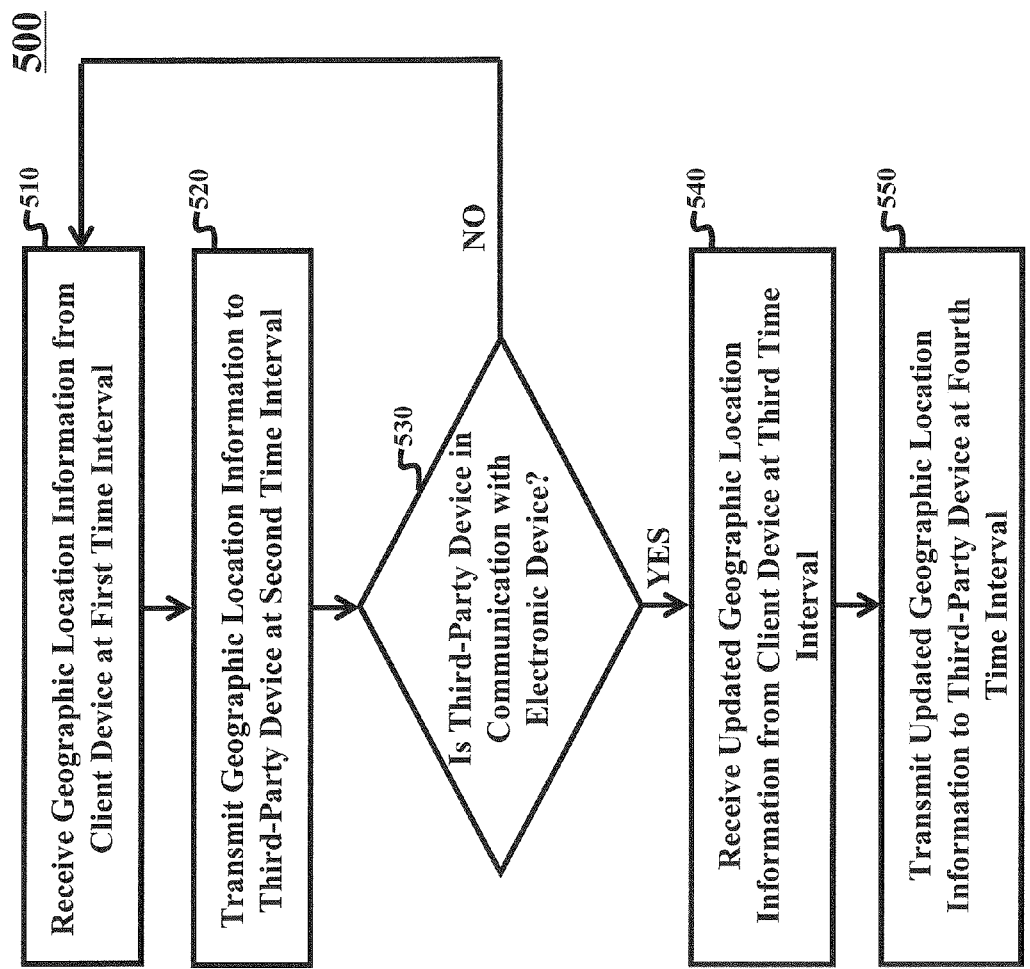
FIG. 5 is an illustration of another embodiment of a method of providing geographic location information for an electronic device.

FIG. 5 is an illustration of an embodiment of a method of providing geographic location information for an electronic device. Method 500 can occur using, for example, computer system 100 of FIG. 1. For ease of explanation, computer system 100 will be used to facilitate in the description of method 500. Also, for ease of explanation, each of client devices $110_0$-$110_N$ is a mobile phone with an embedded GPS and roaming signal generator (e.g., GPS 230 and roaming signal generator 240 of FIG. 2, respectively), network 120 is a mobile telecommunication network, and server device 130 is a mobile network server. Based on the description herein, a person skilled in the relevant art will recognize that method 400 can be executed on other types of computer systems with other types of associated client devices, networks, and servers. These other types of computer systems are within the scope and spirit of the embodiments described herein.

The description of method 500 is similar to that of methods 300 and 400 of FIGS. 3 and 4, respectively. In particular, method 500 is described from the perspective of the server device (e.g., server device 130), in which the server device receives geographic location information of the mobile phone and transmits the information to the third-party device. Conversely, the server device can also receive geographic location information of the third-party device and transmit the information to the mobile phone.

In reference to step 510 of FIG. 5, server device 130 receives geographic location information from the client device at a first time interval. The first time interval associated with step 510 can be determined in a similar manner as the first time interval associated with step 310 of FIG. 3 (described above). In an embodiment, server device 130 operates with the client device in a pull implementation, in which server device 130 requests the geographic location data from the client device at the first time interval. In addition, with the pull implementation, server device 130 also communicates with the client device to modify the first time interval.

In step 520, after server device 130 receives the geographic location information of the client device, server device 130 transmits the location information to the third-party device at a second time interval. In an embodiment, the second time interval can be substantially the same as, longer than, or shorter than the first time interval of step 510. The second time interval can depend on a control setting in an LBS application on the third-party device, which determines the frequency at which the third-party device receives the geographic location information of the mobile phone, according to an embodiment.

In step 530, a determination is made regarding whether the mobile phone and the third-party device are in communication with one another. A communication link can be formed between the mobile phone and the third-party device in a variety of ways such as, for example and without limitation, voice communication, text messaging, and email communication. Since the communication link is formed over communication system 100, communication system 100 can provide an indication to server device 130 that the communication link exists between the electronic devices, according to an embodiment.

With respect to step 540 of FIG. 5, if the mobile phone and the third-party device are in communication with one another, server device 130 receives updated geographic location information for the mobile phone at a third time interval. In an embodiment, the third time interval is shorter than the first and second time intervals of steps 510 and 520, respectively. The third time interval associated with step 540 can be determined in a similar manner as the second time interval associated with step 330 of FIG. 3 (described above).

In step 550, if the mobile phone and the third-party device are in communication with one another, server device 130 transmits the updated geographic location information (from step 540) to the third-party device at a fourth time interval. In an embodiment, the fourth time interval can be substantially the same as, longer than or shorter than the third time interval. However, in an embodiment, the fourth time interval is shorter than the first and second time intervals of steps 510 and 520, respectively. The fourth time interval can depend on a control setting in an LBS application on the third party device, which determines the frequency at which the third-party device receives the updated geographic location information of the mobile phone, according to an embodiment.

Based on the description herein, a person skilled in the relevant art will recognize that although the embodiments described above refer to a communication link between two electronic devices (e.g., a mobile phone and a third-party device), the embodiments described above herein are equally applicable to a communication link between two or more electronic devices. For instance, two or more electronic devices (e.g., client devices $110_0$-$110_N$ of FIG. 1) can establish a communication link with one another via, for example and without limitation, an on-line group chat application. During this exemplary communication link, the two or more electronic devices can transmit each of their respective geographic location information to a server device (e.g., using method 300 of FIG. 3), in which each of the electronic devices can also receive geographic location information for another electronic device by accessing the server device (e.g., using method 400 of FIG. 4).

Figure 6:
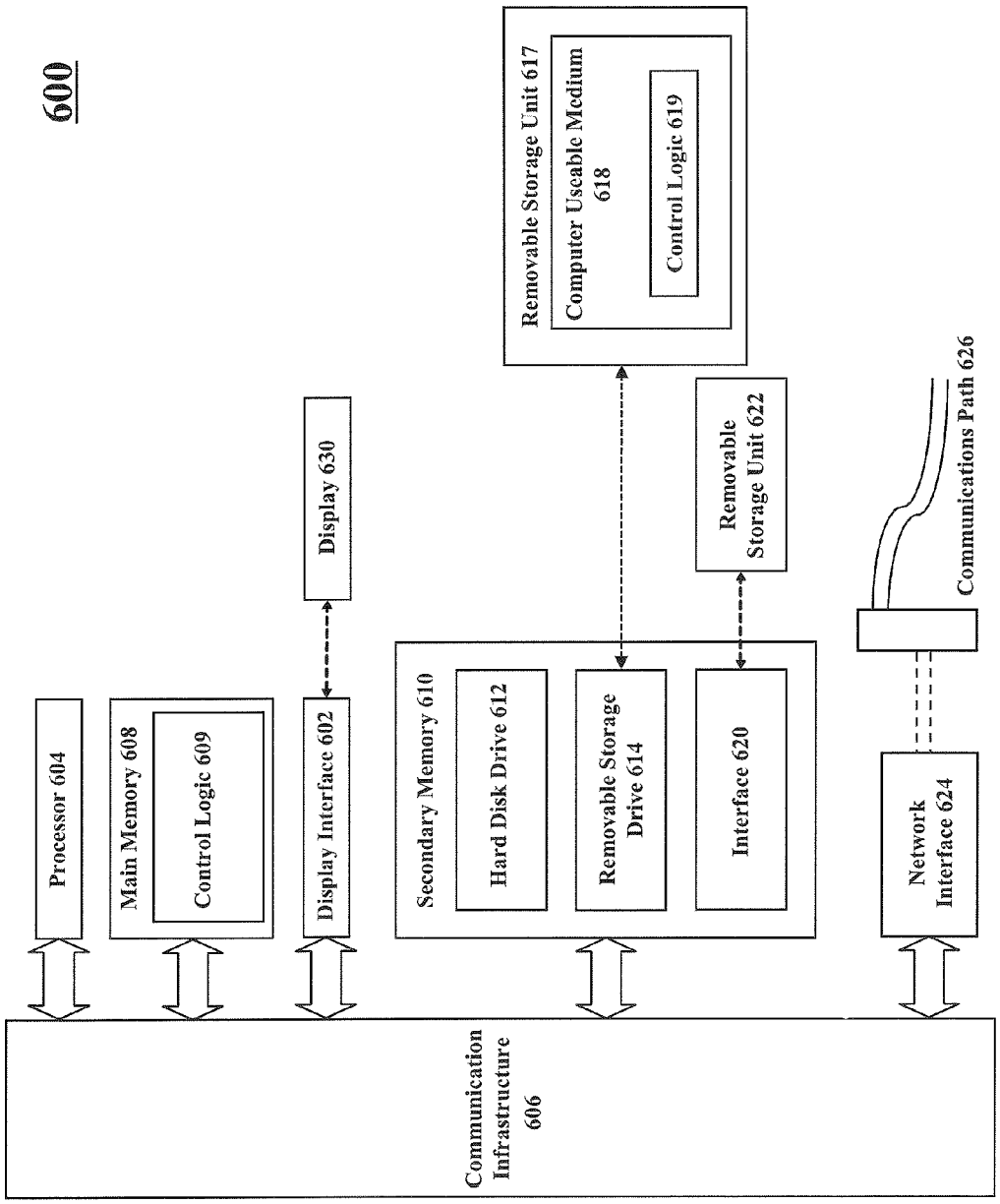
FIG. 6 is an illustration of an example computer system in which embodiments can be implemented.

Various aspects of the embodiments described herein may be implemented in software, firmware, hardware, or a combination thereof. FIG. 6 is an illustration of another example computer system 600 in which embodiments described herein, or portions thereof, can be implemented as computer-readable code. For example, the methods illustrated by flowchart 300 of FIG. 3, flowchart 400 of FIG. 4, and flowchart 500 of FIG. 5 can be implemented in computer system 600. Various embodiments are described in terms of this example computer system 600. After reading this description, it will become apparent to a person skilled in the relevant art how to implement embodiments described herein using other computer systems and/or computer architectures.

Computer system 600 can be any commercially available and well known computer capable of performing the functions described herein, such as computers available from International Business Machines, Apple, Sun, HP, Dell, Compaq, Cray, etc.

Computer system 600 includes one or more processors, such as processor 604. Processor 604 may be a special purpose or a general-purpose processor. Processor 604 is connected to a communication infrastructure 606 (e.g., a bus or network).

Computer system 600 also includes a main memory 608, preferably random access memory (RAM), and may also include a secondary memory 610. Main memory 608 has stored therein a control logic 609 (computer software) and data. Secondary memory 610 can include, for example, a hard disk drive 612, a removable storage drive 614, and/or a memory stick. Removable storage drive 614 can comprise a floppy disk drive, a magnetic tape drive, an optical disk drive, a flash memory, or the like. The removable storage drive 614 reads from and/or writes to a removable storage unit 617 in a well-known manner. Removable storage unit 618 can include a floppy disk, magnetic tape, optical disk, etc. which is read by and written to by removable storage drive 618. As will be appreciated by persons skilled in the relevant art, removable storage unit 617 includes a computer-usable storage medium 618 having stored therein a control logic 619 (e.g., computer software) and/or data.

In alternative implementations, secondary memory 610 can include other similar devices for allowing computer programs or other instructions to be loaded into computer system 600. Such devices can include, for example, a removable storage unit 622 and an interface 620. Examples of such devices can include a program cartridge and cartridge interface (such as those found in video game devices), a removable memory chip (e.g., EPROM or PROM) and associated socket, and other removable storage units 622 and interfaces 620 which allow software and data to be transferred from the removable storage unit 622 to computer system 600.

Computer system 600 also includes a display 630 that communicates with computer system 600 via a display interface 602. Although not shown in computer system 600 of FIG. 6, as would be understood by a person skilled in the relevant art, computer system 600 can communicate with other input/output devices such as, for example and without limitation, a keyboard, a pointing device, and a Bluetooth device.

Computer system 600 can also include a communications interface 624. Communications interface 624 allows software and data to be transferred between computer system 600 and external devices. Communications interface 624 can include a modem, a network interface (such as an Ethernet card), a communications port, a PCMCIA slot and card, or the like. Software and data transferred via communications interface 624 are in the form of signals, which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 617, removable storage unit 618, and a hard disk installed in hard disk drive 612. Computer program medium and computer-usable medium can also refer to memories, such as main memory 608 and secondary memory 610, which can be memory semiconductors (e.g., DRAMs, etc.). These computer program products provide software to computer system 600.

Computer programs (also called computer control logic) are stored on main memory 608 and/or secondary memory 610. Computer programs may also be received via communications interface 624. Such computer programs, when executed, enable computer system 600 to implement embodiments described herein. In particular, the computer programs, when executed, enable processor 604 to implement processes described herein, such as the steps in the methods illustrated by flowchart 300 of FIG. 3, flowchart 400 of FIG. 4, and flowchart 500 of FIG. 5, discussed above. Accordingly, such computer programs represent controllers of the computer system 600. Where embodiments are implemented using software, the software can be stored on a computer program product and loaded into computer system 600 using removable storage drive 614, interface 620, hard drive 612 or communications interface 624.

Based on the description herein, a person skilled in the relevant art will recognize that the computer programs, when executed, can enable one or more processors to implement processes described above, such as the steps in the method illustrated by flowchart 300 of FIG. 3, flowchart 400 of FIG. 4, and flowchart 500 of FIG. 5. In an embodiment, the one or more processors can be part of a computing device incorporated in a clustered computing environment or server farm. Further, in an embodiment, the computing process performed by the clustered computing environment such as, for example, the steps in the method illustrated by flowchart 300, flowchart 400, and flowchart 500 may be carried out across multiple processors located at the same or different locations.

Based on the description herein, a person of skilled in the relevant art will recognize that the computer programs, when executed, can enable multiple processors to implement processes described above, such as the steps in the method illustrated by flowchart 300 of FIG. 3, flowchart 400 of FIG. 4, and flowchart 500 of FIG. 5. In an embodiment, the computing process performed by the multiple processors can be carried out across multiple processors located at a different location from one another.

Embodiments are also directed to computer program products including software stored on any computer-usable medium (e.g., computer useable medium 618 and 631). Such software, when executed in one or more data processing device, causes a data processing device(s) to operate as described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments have been described above, it should be understood that they have been presented by way of example only, and not limitation. It will be understood by those skilled in the relevant art that various changes in form and details can be made therein without departing from the spirit and scope of the embodiments described herein. It should be understood that this description is not limited to these examples. This description is applicable to any elements operating as described herein. Accordingly, the breadth and scope of this description should not be limited by any of the above-described exemplary embodiments, but should be defined only in accordance with the following claims and their equivalents.

What is claimed is:

1. A method of providing geographic location information for an electronic device, the method comprising:
   transmitting geographic location information for the electronic device to a server device at a first time interval;
   determining whether the electronic device is in communication with a third-party device, wherein determining whether the electronic device is in communication with the third-party device comprises determining whether a communication link is established between the electronic device and the third-party device, the communication link including a voice communication, a text message, an e-mail communication, or a combination thereof between the electronic device and the third-party device; and
   transmitting the geographic location information for the electronic device to the server device at a second time interval to provide updates of the geographic location information at the second time interval shorter than the first time interval when the electronic device is in communication with the third-party device, wherein the third-party device is allowed to access and view the geographic location information for the electronic device, via the server device, during the communication.

2. The method of claim 1, wherein the transmitting the geographic location information for the electronic device to the server device at the first time interval comprises transmitting Global Position System (GPS) location information for the electronic device.

3. The method of claim 1, wherein the transmitting the geographic location information for the electronic device at the second time interval comprises transmitting GPS location information for the electronic device to the server device.

4. The method of claim 3, wherein the transmitting GPS location information for the electronic device to the server device comprises transmitting GPS location information relating to latitude-longitude coordinates, a street location, a city location, a state location, a country location of the electronic device, or a combination thereof.

5. The method of claim 4, wherein the transmitting GPS location information relating to the electronic device comprises transmitting the city location, the state location, the country location of the electronic device, or a combination thereof when the third-party device is located farther than a predetermined distance from the electronic device.

6. The method of claim 5, wherein the transmitting the city location, the state location, the country location of the electronic device, or the combination thereof, comprises excluding the latitude-longitude coordinates, the street location, or a combination thereof, from the GPS location information when the electronic device and the third-party device are located in different cities from one another.

7. The method of claim 1, wherein the transmitting the geographic location information for the electronic device at the second time interval comprises determining the second time interval based on a rate of change in geographic location information over time.

8. A computer-usable storage medium having computer program logic recorded thereon that, when executed by one or more processors, provides geographic location information for an electronic device, the computer program logic comprising:
   first computer readable program code that enables a processor to transmit geographic location information for the electronic device to a server device at a first time interval;
   second computer readable program code that enables a processor to determine whether the electronic device is in communication with a third-party device, wherein the second computer readable program code further enables a processor to determine whether a communication link is established between the electronic device and the third-party device, the communication link including a voice communication, a text message, an e-mail communication, or a combination thereof between the electronic device and the third-party device; and
   third computer readable program code that enables a processor to transmit the geographic location information for the electronic device to the server device at a second time interval when the electronic device is in communication with the third-party device to provide updates of the geographic location information at the second time interval shorter than the first time interval while the electronic device is in communication with the third-party device, wherein the third-party device is allowed to access and view the geographic location information for the electronic device, via the server device, during the communication.

9. The computer-usable storage medium of claim 8, wherein the first computer readable program code comprises:
   fourth computer readable program code that enables a processor to transmit GPS location information for the electronic device to the server device.

10. The computer-usable storage medium of claim 8, wherein the third computer readable program code comprises:
fourth computer readable program code that enables a processor to transmit GPS location information for the electronic device to the server device at the second time interval.

11. The computer-usable storage medium of claim 9, wherein the fourth computer readable program code comprises:
fifth computer readable program code that enables a processor to transmit GPS location information relating to latitude-longitude coordinates, a street location, a city location, a state location, a country location of the electronic device, or a combination thereof.

12. The computer-usable storage medium of claim 11, wherein the fifth computer readable program code comprises:
sixth computer readable program code that enables a processor to transmit the city location, state location, the country location of the electronic device, or a combination thereof when the third-party device is farther than a predetermined distance from the electronic device.

13. The computer-usable storage medium of claim 10, wherein the third computer readable program code comprises:
fifth computer readable program code that enables a processor to determine the second time interval based on a rate of change in the geographic_location information over time.

14. A system that provides geographic location information for an electronic device, the system comprising:
a Global Positioning System (GPS) configured to calculate geographic location information for the electronic device;
a transceiver device configured to transmit the geographic location information to a server device at a first time interval; and
a computing device configured to:
determine whether the electronic device is in communication with a third-party device by determining whether a communication link including a voice communication, a text message, or an e-mail communication is established between the electronic device and the third-party device; and
transmit, via the transceiver device, the geographic location information for the electronic device to the server device at a second time interval when the electronic device is in communication with the third-party device to provide updates of the geographic location information at the second time interval while the electronic device is in communication with the third-party device, wherein the second time interval is shorter than the first time interval.

15. The system of claim 14, wherein the transceiver device is configured to transmit GPS location information for the electronic device to the server device, wherein the third-party device is allowed to access and view the geographic location for the electronic device, via the server device, during the communication.

16. The system of claim 15, wherein the transceiver device is configured to transmit GPS location information relating to latitude-longitude coordinates, a street location, a city location, a state location, a country location of the electronic device, or a combination thereof.

17. The system of claim 16, wherein the transceiver device is configured to transmit the city location, the state location, the country location of the electronic device, or a combination thereof when the third-party device is located farther than a predetermined distance from the electronic device.

18. The system of claim 14, wherein the computing device comprises one or more processors.

19. The system of claim 14, wherein the computing device is configured to determine the second time interval based on a rate of change in the geographic location information over time.

20. A method of providing geographic location information for an electronic device, the method comprising:
receiving geographic location information for the electronic device at a first time interval;
transmitting the geographic location information to a third-party device at a second time interval;
determining whether the electronic device is in communication with the third-party device, wherein determining whether the electronic device is in communication with the third-party device comprises determining whether a communication link is established between the electronic device and the third-party device, the communication link including a voice communication, a text message, an e-mail communication, or a combination thereof between the electronic device and the third-party device;
receiving the geographic location information for the electronic device at a third time interval when the electronic device is in communication with the third-party device, wherein the third time interval is shorter than the first and second time intervals; and
transmitting the geographic location information to the third-party device at a fourth time interval when the electronic device is in communication with the third-party device, wherein the fourth time interval is shorter than the first and second time intervals.

21. The method of claim 20, wherein the receiving the geographic location information comprises receiving Global Position System (GPS) location information for the electronic device.

22. The method of claim 20, wherein the transmitting the geographic location information comprises transmitting the geographic location information at the second time interval, the second time interval being substantially the same as, longer than, or shorter than the first time interval.

23. The method of claim 20, wherein the transmitting the geographic location information comprises transmitting the updated geographic location information at the fourth time interval, the fourth time interval being substantially the same as, longer than, or shorter than the third time interval.

24. A computer-usable storage medium having computer program logic recorded thereon that, when executed by one or more processors, provides geographic location information for an electronic device, the computer program logic comprising:
first computer readable program code that enables a processor to receive geographic location information for the electronic device at a first time interval; second computer readable program code that enables a processor to transmit the geographic location information to a third-party device at a second time interval;
third computer readable program code that enables a processor to determine whether the electronic device is in communication with the third-party device, wherein the third computer readable program code further enables a processor to determine whether a communication link is established between the electronic device and the third-party device, the communication link including a voice communication, a text message, an e-mail communication, or a combination thereof between the electronic device and the third-party device;

fourth computer readable program code that enables a processor to receive the geographic location information for the electronic device at a third time interval when the electronic device is in communication with the third-party device, wherein the third time interval is shorter than the first and second time intervals; and fifth computer readable program code that enables a processor to transmit the geographic location information to the third-party device at a fourth time interval when the electronic device is in communication with the third-party device, wherein the fourth time interval is shorter than the first and second time intervals.

25. The computer-usable storage medium of claim 24, wherein the first computer readable program code comprises:
sixth computer readable program code that enables a processor to receive Global Position System (GPS) location information for the electronic device.

26. The computer-usable storage medium of claim 24, wherein the second computer readable program code comprises:
sixth computer readable program code that enables a processor to transmit the geographic location information at the second time interval, the second time interval being substantially the same as, longer than, or shorter than the first time interval.

27. The computer-usable storage medium of claim 24, wherein the fifth computer readable program code comprises:
sixth computer readable program code that enables a processor to transmit the updated geographic location information at the fourth time interval, the fourth time interval being substantially the same as, longer than, or shorter than the third time interval.

* * * * *